United States Patent
Lin

(10) Patent No.: US 7,249,857 B2
(45) Date of Patent: Jul. 31, 2007

(54) DEVICE FOR FASTENING AND ADJUSTING POSITION OF INTEGRATION ROD OF PROJECTION OPTICAL SYSTEM

(75) Inventor: Wei-Szu Lin, Hsinchu (TW)

(73) Assignee: Young Optics Inc. (TW)

( * ) Notice: Subject to any disclaimer, the term of this patent is extended or adjusted under 35 U.S.C. 154(b) by 177 days.

(21) Appl. No.: 11/195,541

(22) Filed: Aug. 1, 2005

(65) Prior Publication Data
US 2006/0092391 A1    May 4, 2006

(30) Foreign Application Priority Data
Oct. 29, 2004    (TW) ............................... 93133118 A

(51) Int. Cl.
*G03B 21/14* (2006.01)
(52) U.S. Cl. .................. 353/122; 353/38; 353/119; 385/901
(58) Field of Classification Search ............ 353/98, 353/99, 119, 38, 122; 385/133, 901
See application file for complete search history.

(56) References Cited
U.S. PATENT DOCUMENTS

| | | | |
|---|---|---|---|
| 6,364,493 B1 * | 4/2002 | Kakuta et al. ............. | 353/122 |
| 6,773,118 B2 * | 8/2004 | Lee ............................. | 353/122 |
| 6,905,214 B2 * | 6/2005 | Tani ............................. | 353/56 |
| 6,917,481 B2 * | 7/2005 | Shimizu et al. ............. | 359/819 |
| 6,926,413 B2 * | 8/2005 | Akiyama ..................... | 353/122 |
| 7,004,586 B2 * | 2/2006 | Morinaga .................... | 353/20 |
| 7,076,145 B2 * | 7/2006 | Kitamura et al. ........... | 385/134 |
| 7,182,471 B2 * | 2/2007 | Yoshikawa ................... | 353/98 |

* cited by examiner

*Primary Examiner*—William C. Dowling
(74) *Attorney, Agent, or Firm*—Andrew D. Fortney

(57) ABSTRACT

The present invention discloses a device for fastening an integration rod to an inner wall of a housing in a projection optical system and for adjusting a horizontal position and a vertical position of the integration rod corresponding to the inner wall. The fastening/adjusting device includes a frame, a sheath, a first spring, a second spring, a first adjustable screw, and a second adjustable screw. The integration rod is disposed in the sheath, and the sheath is disposed between the frame and the inner wall. The first adjustable screw pushes forward the integration rod, so that the first spring is compressed. The second adjustable screw pushes forward the sheath, so that the second spring is compressed. Therefore, the horizontal and vertical position of the integration rod corresponding to the inner wall can be respectively adjusted by adjusting the first and second adjustable screw.

6 Claims, 4 Drawing Sheets

DEVICE FOR FASTENING AND ADJUSTING POSITION OF INTEGRATION ROD OF PROJECTION OPTICAL SYSTEM

BACKGROUND OF THE INVENTION

1. Field of the Invention

The present invention relates to an integration rod of a projection optical system, and more particular to a device for fastening/adjusting the position of the integration rod when the integration rod is oblique.

2. Description of the Prior Art

In the prior art, the projection optical system comprises an integration rod to homogenize the light passing through it. Afterward, the light being homogenized is shone on a light valve after passing through the integration rod, so that the brightness of the image projected on a display screen is uniform. Once the integration rod becomes oblique during the process of manufacture or assembly, the light cannot fully pass through the integration rod. Accordingly, the light that cannot pass through the integration rod is lost, such that the brightness of the projected image decreases. Therefore, the position of the integration rod should be adjusted after being assembled.

Referring to FIG. 1, FIG. 1 is a schematic diagram of a projection optical system 10, an integration rod 12, and a fastening/adjusting device 14 of the prior art. The device 14 is used for fastening the integration rod 12 onto an inner wall 16 of a housing 11 of the projection optical system 10. The device 14 is also used for adjusting a horizontal position and a vertical position of the integration rod 12 relative to the inner wall 16 of the projection optical system 10. The device 14 comprises a plate spring 15 and two adjusting screws 14a and 14b. The plate spring 15 is monolithically formed with the device 14, and a top surface and a side surface of the plate spring have a metal spring piece 15a and 15b respectively. The adjusting screw 14a corresponding to the metal spring piece 15a is used for adjusting the vertical position of the integration rod 12. The adjusting screw 14b corresponding to the metal spring piece 15b is used for adjusting the horizontal position of the integration rod 12.

As shown in FIG. 1, because the two adjusting screws 14a and 14b both directly adjust the integration rod 12, one of the adjusting screws influences the other when adjusting the integration rod 12. After the device 14 has been used for a span of time, the outer frame of the integration rod 12 is damaged. When one of the two adjusting screws 14a and 14b sinks into the outer frame of the integration rod 12 and cannot adjust the position of the integration rod 12, the other one is influenced and no longer able to adjust the position of the integration rod 12. Moreover, the device 14 of the prior art utilizes the metal spring pieces 15a and 15b to adjust and restore the position of the projection optical system 12. In general, the restoring force of the metal spring piece is not strong and is often not enough for practical use. Furthermore, the outer frame of the integration rod 12 of the prior art directly contacts the inner wall 16 of the housing 11. When the position of the integration rod 12 is adjusted, there is friction between the integration rod 12 and the inner wall 16, and consequently the adjusted direction is oblique.

Therefore, the present invention provides a device for fastening/adjusting the position of an integration rod of a projection optical system to solve the above problems.

SUMMARY OF THE INVENTION

One objective of the present invention is to provide a device for fastening/adjusting the position of an integration rod of a projection optical system, such that a horizontal position and a vertical position of the integration rod can be adjusted respectively, and a better restoring force is obtained.

The present invention discloses a device for fastening an integration rod to an inner wall of a housing in a projection optical system and for adjusting a horizontal position and a vertical position of the integration rod corresponding to the inner wall. The fastening/adjusting device includes a frame, a sheath, a first spring, a second spring, a first adjustable screw, and a second adjustable screw. The integration rod is disposed in the sheath, and the sheath is disposed between the frame and the inner wall. The first adjustable screw is used for pushing forward the integration rod, so that the first spring is compressed. The second adjustable screw is used for pushing forward the sheath, so that the second spring is compressed. Thus, the horizontal and vertical position of the integration rod corresponding to the inner wall can be respectively adjusted by adjusting the first and second adjustable screw.

Because the device of the present invention can respectively adjust the vertical position and the horizontal position of the integration rod of the projection optical system, even if one direction cannot be adjusted due to some reasons, the other one can still be adjusted. Furthermore, the present invention utilizes springs with better restoring force to overcome the disadvantage that the restoring force of the plate spring of the prior art is insufficient.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
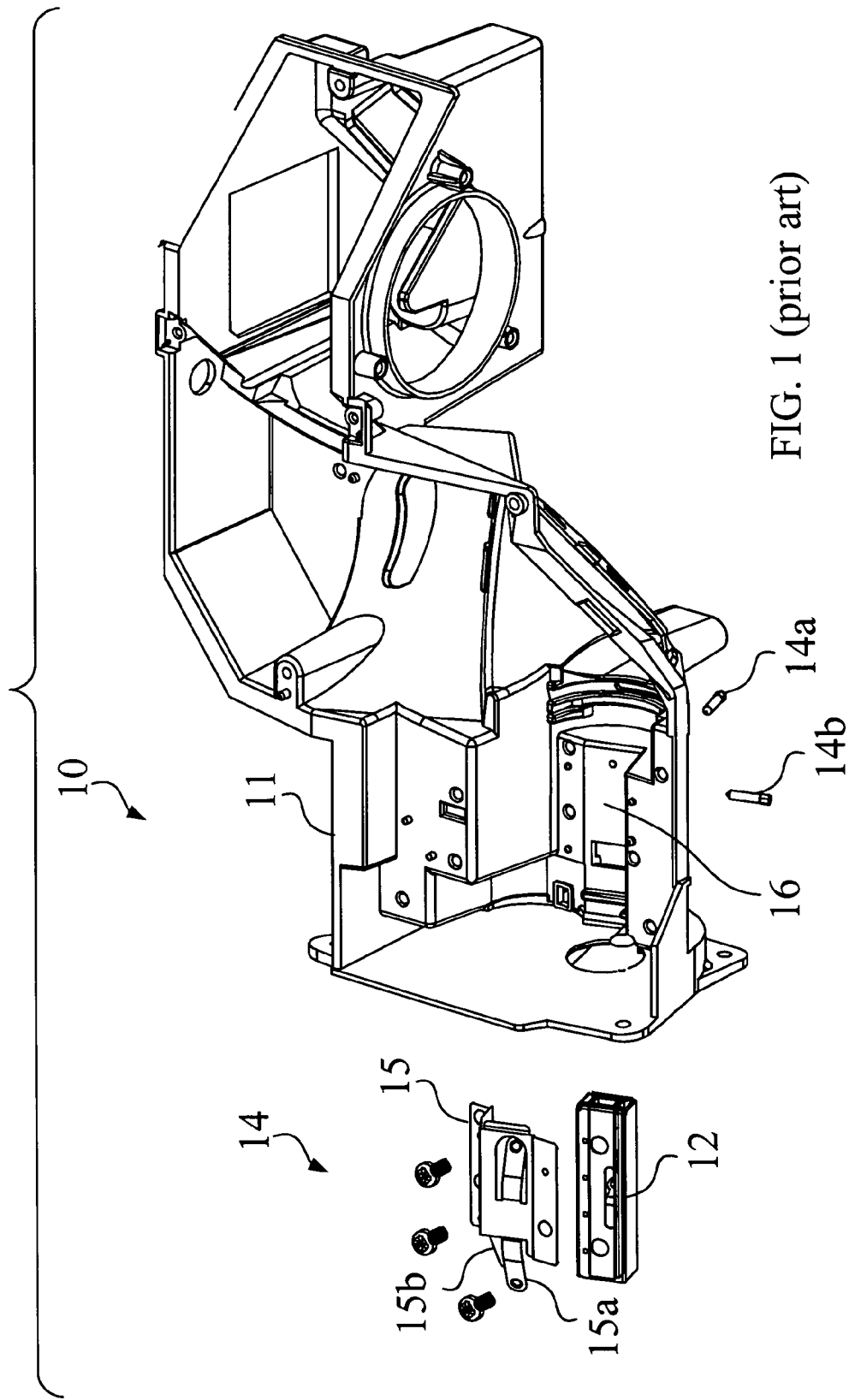
FIG. 1 is a schematic diagram of a projection optical system, an integration rod, and a fastening/adjusting device of the prior art.
Figure 2:
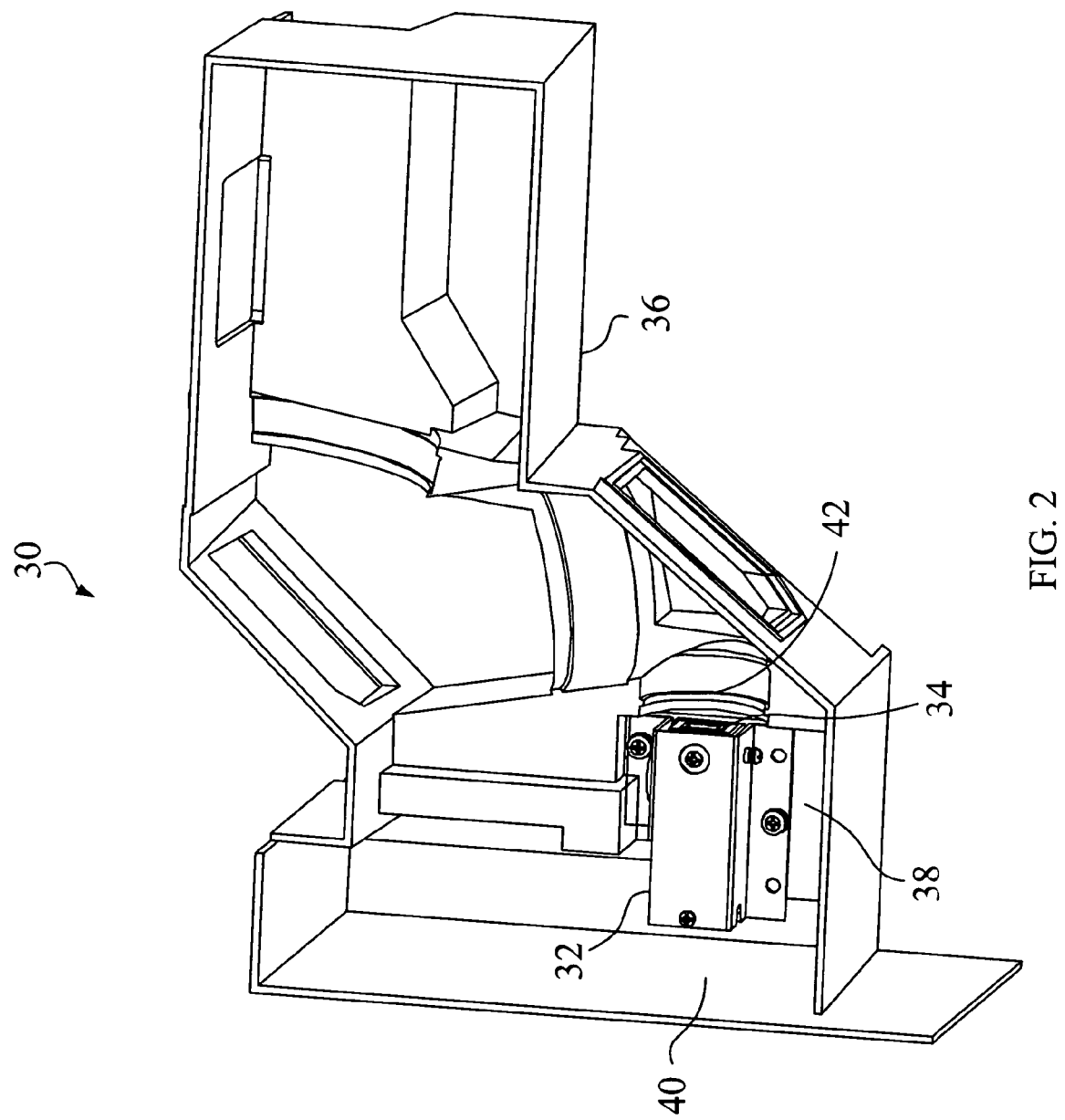
FIG. 2 is a schematic diagram of an integration rod fastened onto a housing of a projection optical system by a device according to one embodiment of the present invention.

As shown in FIG. 2, the device 32 of the present invention is used for fastening an integration rod 34 onto an inner wall 38 of a housing 36 of the projection optical system 30. The device 32 is also used for adjusting a horizontal position and a vertical position of the integration rod 34 relative to the inner wall 38 of the housing 36. The inner wall 38 of the housing 36 thereon defines a front side 40 and a back side 42.

Figure 3:
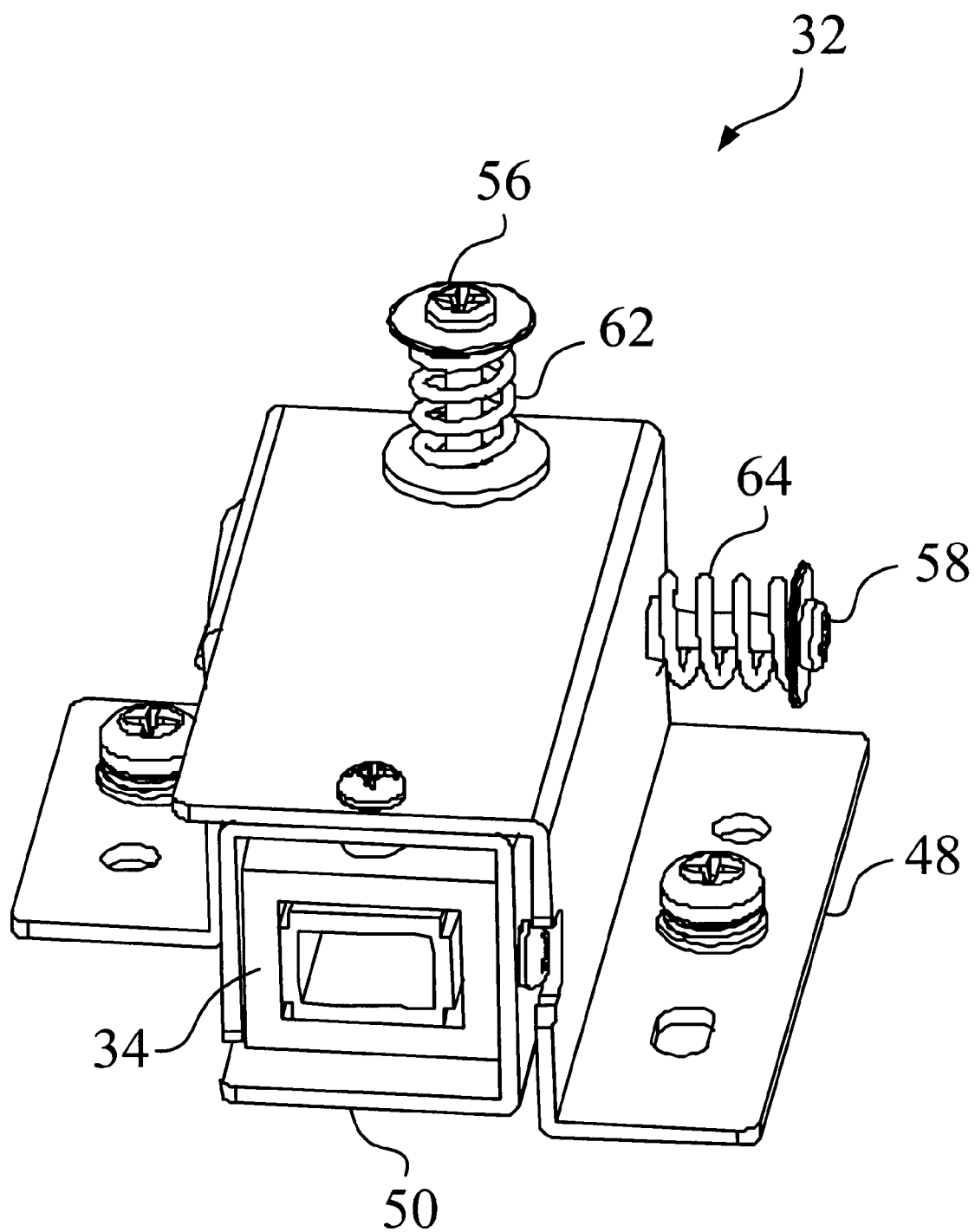
FIG. 3 is an outside view of the device and the integration rod shown in FIG. 2.
Figure 4:
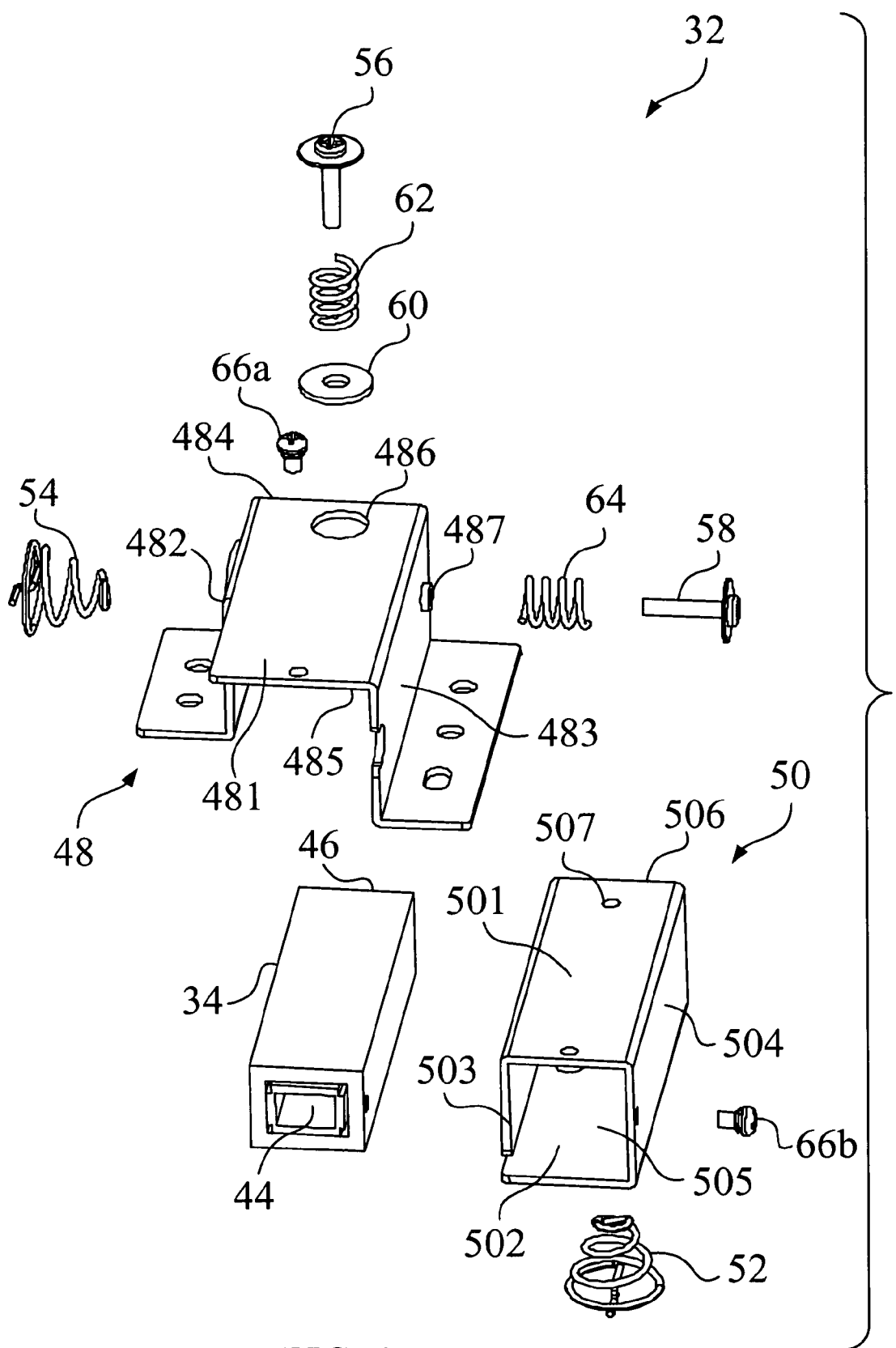
FIG. 4 is an exploded view of the device and the integration rod shown in FIG. 3.

As shown in FIG. 3 and FIG. 4, the device 32 comprises a substantially U-shaped frame 48, a sheath 50, a first spring 52, a second spring 54, a first adjustable screw 56, and a second adjustable screw 58.

The frame 48 has a first top wall 481, a first side wall 482, a second side wall 483, a frond edge 484, a back edge 485, a first through hole 486, and a second through hole 487. The first side wall 482 is perpendicular to the first top wall 481, and the second side wall 483 is opposite to the first side wall 482. The first hole 486 is formed on the first top wall 481 near the back edge 485 of the frame 48, and the second hole 487 is formed on the second side wall 483 near the back edge 485 of the frame 48. The second hole 487 has an inner thread. The frame 48 is mounted onto the inner wall 38 of the housing 36 with the front edge 484 leaning forward to the front side 40 of the inner wall 38, such that the first top wall 481 is parallel with the inner wall 38, and the first side wall 482 and the second side wall 483 are perpendicular to the inner wall 38.

The sheath 50 has a second top wall 501, a bottom wall 502, a third side wall 503, a fourth side wall 504, a front opening 505, a back opening 506, and a third through hole 507. The bottom wall 502 is opposite to the second top wall 501 of the sheath 50, the third side wall 503 is perpendicular to the second top wall 501, and the fourth side wall 504 is opposite to the third side wall 503. The third hole 507 is formed on the second top wall 501 near the back opening 506 of the sheath 50. The third hole 507 has an inner thread.

The integration rod 34 has an entrance facet 44 and an exit facet 46. The integration rod 34 is inserted into the sheath 50, and the entrance facet 44 of the integration rod 34 is engaged with the front opening 505 of the sheath 50. The integration rod 34 together with the sheath 50 are disposed between the frame 48 and the inner wall 38 with the entrance facet 44 leaning forward to the front side 40 of the inner wall 38, and the third hole 507 faces the first hole 486 of the frame 48.

The first spring 52 is disposed between the integration rod 34 and the bottom wall 502 of the sheath 50, and the first spring 52 is aligned with the first hole 486 of the frame 48 and the third hole 507 of the sheath 50. The second spring 54 is disposed between the third side wall 503 of the sheath 50 and the first side wall 482 of the frame 48, and the second spring 54 is aligned with the second hole 487 of the frame 48. In an embodiment, the first spring 52 and the second spring 54 may respectively be a disk-type spring or the like. Because the coefficient of elasticity of the disk-type spring maintains a constant, and the disk-type spring can be compressed into the thickness of the diameter of a wire, the distance for adjusting the position of the integration rod is increased. Therefore, the embodiment utilizing the disk-type spring is the preferred embodiment.

The first adjustable screw 56 is inserted through the first hole 486 of the frame 48 and the third hole 507 of the sheath 50 to push forward the integration rod 34, such that the first spring 52 is compressed, wherein the vertical position of the integration rod 34 relative to the inner wall 38 is capable of being adjusted by adjusting the first adjustable screw 56. The second adjustable screw 58 is inserted through the second hole 487 of the frame 48 to push forward the fourth side wall 504 of the sheath 50, such that the second spring 54 is compressed, wherein the horizontal position of the integration rod 34 relative to the inner wall 38 is capable of being adjusted by adjusting the second adjustable screw 58.

Compared to the prior art, when the vertical position or the horizontal position of the integration rod 34 is adjusted, the first spring 52 and the second spring 54 can provide a better restoring force.

Because the second adjustable screw 58 acts on the fourth side wall 504 of the sheath 50, it won't be influenced by the first adjustable screw 56. In other words, even if the first adjustable screw 56 cannot be controlled to adjust the vertical position of the integration rod 34, the horizontal position of the integration rod 34 disposed in the sheath 50 can still be adjusted. On the other hand, the first adjustable screw 56 directly acts on the integration rod 34, so it won't be influenced by the second adjustable screw 58. In other words, even if the second adjustable screw 58 cannot be controlled to adjust the horizontal position of the integration rod 34 disposed in the sheath 50, the vertical position of the integration rod 34 disposed in the sheath 50 can still be adjusted.

As shown in FIG. 3 and FIG. 4, the device 32 further comprises a washer 60, a third spring 62, and a fourth spring 64. The washer 60 has a hole and is disposed on the first top wall 481 of the frame 48 where the first adjustable screw 56 is inserted through the washer 60, the first hole 486, and the third hole 507. The third spring 62 is disposed between a cap of the first adjustable screw 56 and the washer 60 in a deformable way, so as to maintain the alignment of the first adjustable screw 56 with the first spring 52. Accordingly, the third spring 62 can prevent the first adjustable screw 56 from loosening by an external force, and the frame 48 can stay in tight contact with the sheath 50. The fourth spring 64 is disposed between a cap of the second adjustable screw 58 and the second side wall 483 in a deformable way, so as to maintain the alignment of the second adjustable screw 58 with the second spring 54. Accordingly, the fourth spring 64 can prevent the second adjustable screw 58 from loosening by an external force.

Moreover, the first top wall 481 of the frame 48 is pivoted to the second top wall 501 of the sheath 50 near the back edge 485 of the frame 48 by a connection unit 66a, such that the frame 48 can rotate with respect to the sheath 50 by the connection unit 66a. The fourth side wall 504 of the sheath 50 is pivoted to the integration rod 34 near the back opening 505 of the sheath 50 by a connection unit 66b, such that the sheath 50 can rotate with respect to the integration rod 34 by the connection unit 66b. The connection units 66a and 66b can be a screw or the like.

Compared to the prior art, because the device of the present invention can respectively adjust the vertical position and the horizontal position of the integration rod of the projection optical system, even if one direction cannot be adjusted due to some reasons, the other one direction can still be adjusted. Furthermore, the present invention utilizes springs with better restoring force to overcome the disadvantage that the restoring force of the plate spring of the prior art is insufficient.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A device for fastening an integration rod of a projection optical system onto a housing of the projection optical system, said device comprising:
   a frame having a first top wall, a first side wall perpendicular to the first top wall, a second side wall opposite to the first side wall, a front edge, a back edge, a first hole formed on the first top wall, and a second hole formed on the second side wall, the front edge of the frame being mounted onto the housing of the projection optical system;
   a sheath disposed in the frame and having a second top wall, a bottom wall opposite to the second top wall, a third side wall perpendicular to the second top wall, a fourth side wall opposite to the third side wall, a front opening, a back opening, and a third hole formed on the top wall, the third hole facing the first hole, the integration rod being inserted into the sheath;

a first spring disposed between the integration rod and the bottom wall of the sheath;

a second spring disposed between the third side wall and the first side wall;

a first adjustable screw inserted through the first hole and the third hole to push forward the integration rod such that the first spring is compressed, wherein the vertical position of the integration rod relative to an inner wall of the housing is adjusted by adjusting the first adjustable screw; and a second adjustable screw inserted through the second hole to push forward the fourth side of the sheath such that the second spring is compressed, wherein the horizontal position of the integration rod relative to the inner wall is adjusted by adjusting the second adjustable screw.

2. The device for fastening an integration rod of a projection optical system onto a housing of the projection optical system of claim 1, further comprising:

a washer with a hole, the washer being disposed on the top wall of the frame, wherein the first adjustable screw is inserted through the washer, the first hole and the third hole;

a third spring, the third spring being disposed between a cap of the first adjustable screw and the washer in a deformable way to maintain the alignment of the first adjustable screw with the first spring; and a fourth spring, the fourth spring being disposed between a cap of the second adjustable screw and the second side wall of the frame in a deformable way to maintain the alignment of the second adjustable screw with the second spring.

3. The device for fastening an integration rod of a projection optical system onto a housing of the projection optical system of claim 2, wherein the first top wall of the frame is pivoted to the second top wall of the sheath near the back edge.

4. The device for fastening an integration rod of a projection optical system onto a housing of the projection optical system of claim 3, wherein the fourth side wall of the sheath is pivoted to the integration rod near the back opening.

5. The device for fastening an integration rod of a projection optical system onto a housing of the projection optical system of claim 1, wherein the first spring and the second spring are disk-type springs.

6. The device for fastening an integration rod of a projection optical system onto a housing of the projection optical system of claim 1, wherein the second hole and the third hole both have an inner thread respectively.

* * * * *